United States Patent
Bühler et al.

(10) Patent No.: US 8,570,001 B2
(45) Date of Patent: Oct. 29, 2013

(54) DEVICE AND METHOD FOR CHARGING AND CONTROLLING THE CHARGE OF A BATTERY

(75) Inventors: Tobias Bühler, Graz (AT); Holger Haiplik, Swindon (GB)

(73) Assignee: AMS AG, Unterpremstaetten (AT)

( * ) Notice: Subject to any disclaimer, the term of this patent is extended or adjusted under 35 U.S.C. 154(b) by 1241 days.

(21) Appl. No.: 11/791,390

(22) PCT Filed: Nov. 3, 2005
(Under 37 CFR 1.47)

(86) PCT No.: PCT/EP2005/011775
§ 371 (c)(1),
(2), (4) Date: May 9, 2008

(87) PCT Pub. No.: WO2006/056302
PCT Pub. Date: Jun. 1, 2006

(65) Prior Publication Data
US 2008/0252262 A1 Oct. 16, 2008

(30) Foreign Application Priority Data
Nov. 26, 2004 (DE) .......... 10 2004 057 239

(51) Int. Cl.
*H02J 7/06* (2006.01)
(52) U.S. Cl.
USPC ........................................... 320/163
(58) Field of Classification Search
USPC .............. 320/132, 152, 157–159, 162–164
See application file for complete search history.

(56) References Cited

U.S. PATENT DOCUMENTS

| | | | |
|---|---|---|---|
| 3,748,567 A | 7/1973 | Arai et al. | |
| 4,194,146 A | 3/1980 | Patry et al. | |
| 4,629,965 A | 12/1986 | Fallon et al. | |
| 4,820,966 A * | 4/1989 | Fridman | 320/116 |
| 5,449,994 A | 9/1995 | Armand et al. | |
| 5,523,671 A | 6/1996 | Stewart et al. | |
| 5,633,573 A | 5/1997 | Van Phuoc et al. | |
| 6,181,103 B1 * | 1/2001 | Chen | 320/106 |
| 6,184,660 B1 | 2/2001 | Hatular | |
| 6,227,204 B1 | 5/2001 | Baumann et al. | |
| 7,554,299 B2 * | 6/2009 | Broad | 320/149 |
| 2002/0089318 A1 * | 7/2002 | Armstrong et al. | 323/285 |
| 2003/0117112 A1 | 6/2003 | Chen et al. | |

FOREIGN PATENT DOCUMENTS

AT 384 693 1/1986
DE 198 38 137 A1 3/2000

OTHER PUBLICATIONS

Dallas Semiconductor, Maxim, DS2770, "Battery Monitor and Charge Controller", May 26, 2005, pp. 1-27.
Maxim, Application Note 2044, "Simple Current Limiter for DS2770-Based Chargers", May 21, 2003, (3 pages).

(Continued)

*Primary Examiner* — Richard V Muralidar
(74) *Attorney, Agent, or Firm* — McDermott Will & Emery LLP

(57) ABSTRACT

An apparatus and a method for charging and for charge monitoring of a rechargeable battery. A charging circuit contains a rechargeable battery (B) and a charging device (L) for charging the rechargeable battery. A measurement device (M) is arranged in the charging circuit and contains a device for determining the rechargeable-battery current and the state of charge of the rechargeable battery. A control device (R) compares a value that is proportional to the rechargeable-battery current with a set value, and controls the charging device.

22 Claims, 2 Drawing Sheets

(56) References Cited

OTHER PUBLICATIONS

Maxim, Application No. 121, "Inaccuracies of Estimating Remaining Cell Capacity with Voltage Measurements Alone", Apr. 23, 2001, (5 pages).
International Preliminary Report on Patentability dated Jun. 14, 2007 issued for the underlying International Application No. PCT/EP2005/011775.
"Switch-Mode, Linear, and Pulse Charging Techniques for Li+ Battery in Mobile Phones and PDAs", Application Note 913, Maxim Integrated Products, Dec. 27, 2001.
Linear Technology LTC 1730-4/LTC 1730-4.2 Datasheet, Linear Technology Corporation, Milpitas, CA, pp. 1-12, (2001).
"Charge Efficiency and Cell Aging Effects of the DS2770 Li+ Pulse Charger vs. Linear Chargers", Application Note 227, Maxim Integrated Products, Dec. 10, 2002.
"DS2770-Based Charger Reference Design", Application Note 201, Dallas Semiconductor, www.maxim-ic.com.
Nguyen, T. et al., "Advanced Battery Charging Techniques: Pulse-Charging in Large-Scale Applications—Design of Divide and Conquer Technique for High-Capacity Batteries", Department of Electrical Engineering, University of Washington, Seattle, WA, pp. 1-6, (Summer 2003).
Popov, Branko N. et al., "Capacity Fade of Li-ion Cells at Elevated Temperatures Cycled Using Pulse and DC Charging Protocols", Abstract No. 146, The Electrochemical Society Meeting, San Francisco, Sep. 2-7, 2001.

* cited by examiner

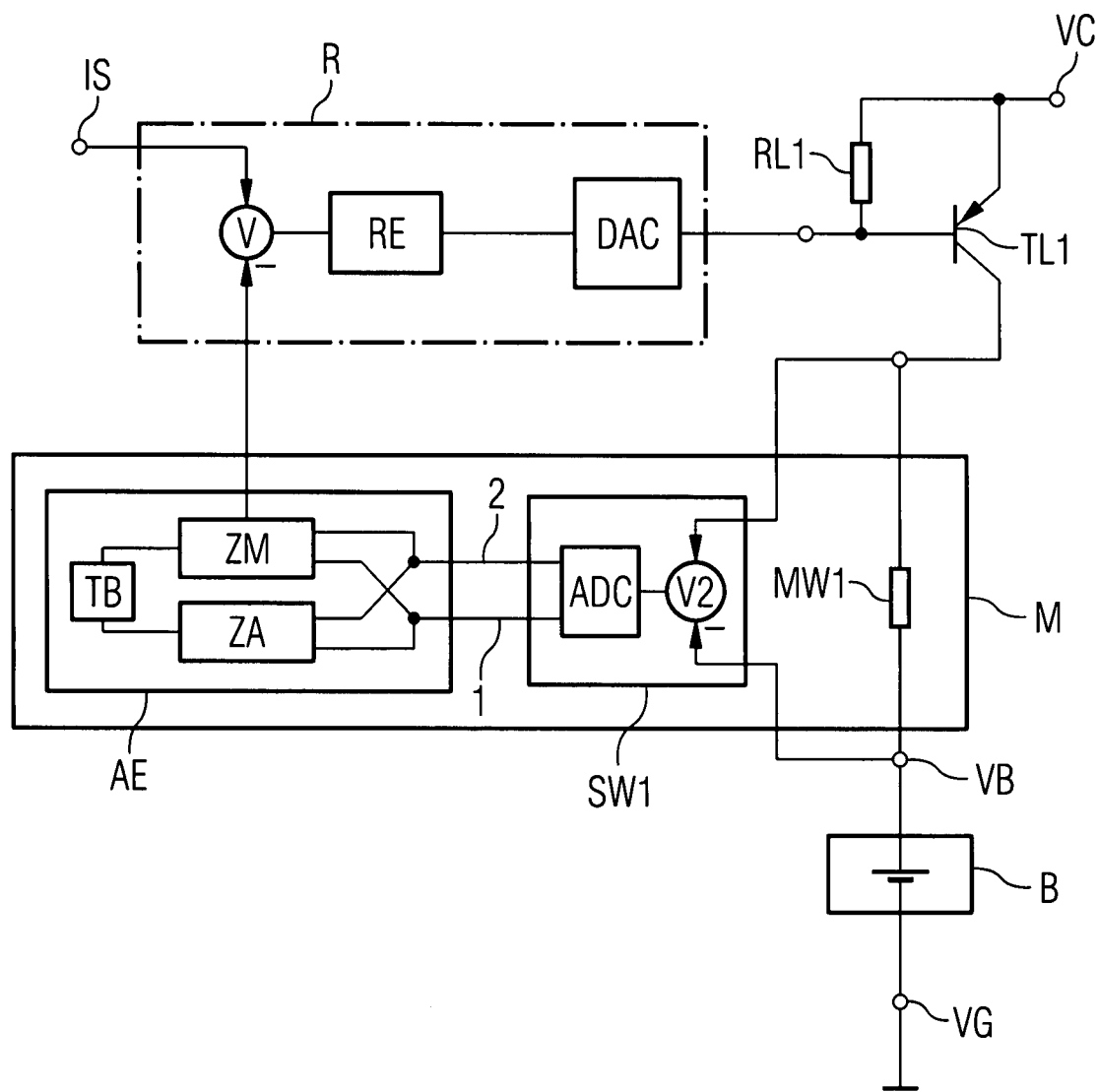

DEVICE AND METHOD FOR CHARGING AND CONTROLLING THE CHARGE OF A BATTERY

RELATED APPLICATIONS

This is a U.S. national stage of application No. PCT/EP2005/011775, filed on Nov. 3, 2005.

This patent application claims the priority of German patent application no. 10 2004 057 239.9 filed Nov. 26, 2004, the disclosure content of which is hereby incorporated by reference.

FIELD OF THE INVENTION

The invention relates to an apparatus for charging and for charge monitoring of a rechargeable battery. The invention also relates to a corresponding method.

BACKGROUND OF THE INVENTION

In every new generation, the further development of portable appliances is distinguished by new functionalities being provided. Every new functionality in this case potentially contributes to an increase in the power consumption. For the user of these appliances, it is becoming increasingly more important to be informed about the remaining time for which they can be used, that is to say the remaining battery or rechargeable-battery capacity. In particular, nickel-cadmium and nickel-metal-hydride rechargeable batteries (NiCd and NiMH rechargeable batteries) are increasingly being replaced by rechargeable batteries which are based on lithium (Li), because these have an excellent energy density per unit volume.

The battery voltage or rechargeable-battery voltage can be measured easily and at low cost as a measure of the state of charge, but does not comply with stringent requirements for the desired accuracy. For example, the rechargeable-battery voltage decreases continuously during discharging, but the relationship between the voltage level and the remaining charge varies highly non-linearly with the temperature and the discharge rate. Depending on the type of rechargeable battery, a voltage measurement as a measure of the state of charge of the rechargeable battery can lead to a measurement error of 100%, or considerably more than this. This can admittedly be corrected well if the temperature and the discharge rate are known.

However, the measurement of these additional parameters makes the process more complicated and expensive than a charge measurement.

A charge measurement which can be carried out by means of a current measurement and a time measurement is therefore more accurate, because current is defined as the change in the charge per unit time. In order to allow a very accurate estimate of the remaining battery capacity to be made, there is a developing trend towards charge meters (fuel gauges) which track the net current flow into and out of the battery or rechargeable battery.

A charge meter such as this comprises an integrated circuit (IC) with a computation unit and additional external components for evaluating the current measurement and for determining the state of charge. A further integrated circuit with external circuitry is, on the other hand, required for charging of the rechargeable battery, by means of which the charging process can be controlled such that it takes place quickly and without any damage to the rechargeable battery.

The publication "DS2770 Battery Monitor and Charge Controller" from Dallas Semiconductor proposes an integrated circuit with external circuitry that combines the functions both of charging and of detection of the state of charge. In particular, this saves valuable space on a circuit board.

The IC can be used to set two rechargeable-battery types (lithium or NiMH) with different charging characteristics. A defined charging program is carried out for the respective rechargeable-battery type depending on its threshold voltage being reached for undervoltage at the output connections of the rechargeable battery.

The charging process itself is carried out with the aid of two constant-current sources, which the IC drives as a function of a voltage criterion. If the rechargeable-battery voltage is below the threshold voltage, that is to say the rechargeable battery has been deep-discharged, a first external transistor with a current-limiting resistor produces a low constant charging current until the threshold voltage is reached. During a normal charging process, when the rechargeable-battery voltage reaches or is higher than the threshold voltage, a comparatively high constant current is fed into the rechargeable battery, by means of a second external transistor. The IC switches between the first and the second transistor, and thus between the low and high charging current, as required. Depending on the rechargeable-battery type, the charging process is ended when a time criterion or a temperature criterion is reached.

The second function of the circuit, that is to say measurement of the rechargeable-battery current and its direction, is carried out by means of the voltage drop across a measurement resistor (shunt) in the ground-side branch of the charging circuit. The current direction into or out of the rechargeable battery is established by a subtraction unit, which establishes the mathematical sign and the magnitude of the current flow. The values are digitized, and registers are used to store the instantaneous current flow and the current accumulated over time.

The two functions of the IC are provided separately. In particular, the rechargeable battery is charged simply by switching the external constant-current sources on and off. If this IC is operated with a charging source with a low impedance, external current limiting is required, by means of additional, and therefore space-consuming, components.

SUMMARY OF THE INVENTION

One object of the invention is to provide an apparatus for detecting a state of charge and for charging a rechargeable battery, as well as a method for operating the apparatus, which results in an improved performance and simplified design of the apparatus.

The invention is based on the idea of linking the rechargeable-battery current measurement with the two functions of charge measurement and charging of the rechargeable battery. This is achieved by controlling the charging of the rechargeable battery. The measured rechargeable-battery current is compared with a reference current, for this purpose. If there is a current difference, the control loop is appropriately adjusted, and the charging current is readjusted until the difference current disappears.

The invention has the advantage that the apparatus allows accurate estimation of the remaining rechargeable-battery capacity with little complexity, while at the same time providing a charging device by means of which a rechargeable battery can be charged effectively and in an optimized form.

The invention has the additional advantage that the control system allows a shorter charging time than known charging devices.

A further advantage of the invention is that the apparatus can be connected to different charging sources without any need for additional cost-driving measures for current limiting.

The invention has the particular advantage that only one charging transistor is required, thus saving costs and space. The charging transistor is regulated by means of the control loop such that it produces different charging currents depending on the desired and intended control characteristic.

The transistor is advantageously provided internally, that is to say on the chip with the integrated circuit. However, it can just as well be provided in the form of an external transistor, if this appears to be expedient under particular conditions.

In particular, the apparatus according to the invention allows lithium-based rechargeable batteries to be charged particularly optimally.

One aspect of the invention is directed to an apparatus for charging and for charge monitoring of a rechargeable battery, comprising a charging circuit which includes a rechargeable battery and a charging device for charging the rechargeable battery, and a measurement device. The measurement device includes a device for determining the rechargeable-battery current and the state of charge of the rechargeable battery. A control device compares a value that is proportional to the rechargeable-battery current with a set value, and controls the charging device.

In one advantageous embodiment, the measurement device contains a signal detection device with a measured-value detection device and a signal converter. In particular, the measured-value detection device contains a measurement resistor (shunt) through which the rechargeable-battery current flows. The signal converter is connected downstream on the output side. The voltage drop across the measurement resistor is a signal proportional to the rechargeable-battery current. This rechargeable-battery current, which is proportional to the voltage drop, is then converted by the signal converter, and is produced at the output of the signal detection device.

The signal converter particularly preferably converts the analog measured voltage drop to a digital signal value. Digital signals can be processed more easily than analog signals. Considerable advantages result in the case of an implementation on a chip, with regard to the space requirement for the digital signal processing, as well.

A voltage/frequency conversion is preferably used as the converter principle for the analog/digital converter (ADC), in which the analog voltage signal is converted to a frequency signal. However, other principles can also be used for the ADC, for example sigma-delta conversion.

The signal converter with voltage/frequency conversion continuously monitors the analog voltage drop across the measurement resistor. The signal converter produces a digital output signal which, in the case of the voltage/frequency converter, is a pulse train with frequency that is directly proportional to a voltage value. Two pulse trains are advantageously provided, which represent a directly proportional measure of the voltage drop across the measurement resistor and are dependent on the current direction of the rechargeable-battery current. Depending on the current direction, the pulse trains result in upward counting or downward counting in downstream measurement device counters or registers.

The evaluation device for the measurement device contains two counters, specifically a counter for detection of the state of charge, whose count is a measure of the state of charge of the rechargeable battery, and a current counter, which corresponds to the instantaneous value of the rechargeable-battery current. If the rechargeable battery is being charged and current is flowing into the rechargeable battery, each counter counts upward, and the count is incremented. Conversely, each counter counts downward when current is being drawn from the rechargeable battery, and the remaining charge capacity is decreasing.

The counts are evaluated by a measurement device computation unit, with the state of charge on the one hand and the instantaneous rechargeable-battery current on the other hand being calculated. If the value of the measurement resistor and the gain of the signal converter are known, the instantaneously flowing current is obtained on the one hand with the aid of the value of the charge counter for the accumulated or integrated current and on the other hand with the aid of the value of the instantaneous current counter. Charge values can be calculated from the current values by means of a timebase, for example a timer.

The total charge which has flowed into and out of the rechargeable battery can be calculated by an association or link between the accumulated current and the accumulation time. The amount of charge stored in the rechargeable battery and the remaining capacity of the rechargeable battery can be estimated using these values.

It is intended for the value of the state of charge counter (accumulating counter) to be produced at a connection. This allows the state of charge of the rechargeable battery to alternatively be processed further outside the apparatus, and for an indication to be provided to the user as to how much remaining rechargeable-battery capacity is still available to him.

The value of the instantaneous current can likewise be obtained using the current counter and time information. For this purpose, a measurement period is defined which is sufficiently short to satisfy the predetermined measurement accuracy. The counter is in each case integrated during successive measurement periods, and its value is emitted at the end of the present period. This value corresponds to a current mean value during the measurement period, and is governed by the gain of the signal converter and the value of the measurement resistor. The time counter and the current counter are then reset, and the measurement starts again.

The instantaneous current value in each case emitted at the end of the present measurement period is emitted to the control device, and forms its actual value (first input value). This actual value is compared in a comparison device (subtractor) with a reference value (second input value). The difference signal from the comparison device is preprocessed in a downstream regulator unit to form a control value for the charging device. The regulator or the regulator unit may be designed and/or programmed in order to produce different control characteristics. The chosen control characteristic then governs which signal drives the charging device.

Both the traditional regulator response such as a digital PI or PID response as well as non-linear control processes or those specific regulator characteristics which are optimized for digital signal processing, for example real-time processes, may be used for the control characteristic. The aim, for example, may be time-optimized charging of the rechargeable battery. In addition, a different regulator response can be provided for a rechargeable battery that has been deep-discharged, to that for a normal standard charging process after a charge output or that which is in turn used to maintain the charge in a rechargeable battery that has been charged. In principle, different regulator programs can also be provided, which may be selected or else self-programmed.

The output signal from the regulator, the control manipulated variable, is preferably converted to an analog signal, once again with the aid of a control signal converter, in particular a digital/analog converter. The analog control signal is supplied to the charging device, and controls it on the input side. The charging device advantageously comprises a charging transistor, whose output circuit feeds the charging current into the rechargeable battery. If, as is preferred, the charging transistor is a p-channel MOS transistor, then the regulator signal controls the gate input, and the rechargeable battery is connected to the drain. The source of the transistor is connected to the charging source, for example a power supply unit of adequate power. A charging resistor (pull-up resistor) can be connected between the source and gate and defines the gate potential with respect to the source potential. A pnp transistor may, of course, also be used as a charging transistor, instead of the MOS transistor.

The closed control loop comprises the rechargeable battery, the measurement device with the evaluation device and the control device, which then controls the charging device for the rechargeable battery. In the steady state, the charging current flowing into the rechargeable battery corresponds to the reference value of the charging current. This means that the current calculated by the evaluation device is used as controlled variable.

It is particularly advantageous for the device for charging the rechargeable battery and for detecting the state of charge of the rechargeable battery to be in the form of an integrated circuit arrangement, to which the rechargeable battery just has to be connected. This allows the entire peripheral apparatus to be in the form of a single component.

If, on the other hand, this is expedient, the measurement resistor and/or the charging device or parts of it need not also be integrated, and may be connected to the circuit as separate elements. This results in optimum matching to the type of rechargeable battery to be charged. It is also possible to design the apparatus to be completely integrated and, in addition to the connections for the rechargeable battery, to provide further connections to which an external measurement device and/or charging device can be connected. The respective internal measurement and charging device can then be disconnected on connection of an external device.

Another aspect of the invention is directed to a method for charging and for charge monitoring of a rechargeable battery:
- a measurement signal for the rechargeable-battery current is detected,
- a digital measurement signal is produced from the measurement signal,
- the digital measurement signal is processed in order to form a first current value for determining the state of charge of the rechargeable battery,
- the digital measurement signal is processed in order to form a second current value,
- the second current value is compared with a reference value, and a difference result is determined,
- a control manipulated variable is produced from the difference result, and
- a charging device for the rechargeable battery is controlled with the aid of the control manipulated variable.

This method has the advantage that it can be carried out using the apparatus as described initially. The method and the apparatus in this case have the advantage that they use feedback for optimally charging the rechargeable battery.

A further refinement of the method provides for the measurement device to detect the rechargeable-battery current as the voltage drop across a measurement resistor, which is located in the current path of the rechargeable-battery, and for the value of this voltage drop to be converted proportionally to a digital signal, preferably to a pulse train at a frequency proportional to the voltage.

A further refinement of the method provides for the direction of the voltage drop across the measurement resistor to define the mathematical sign of the pulse train, and for one pulse train to be produced in each case for a negative or a positive voltage drop. This means that the current flow through the rechargeable battery can be distinguished as to whether the rechargeable battery is being charged or discharged. A positive voltage drop indicates a charging process, and a negative voltage drop indicates a discharging process. The net current flow can be determined by subtraction.

A further refinement of the method provides for an evaluation device to contain an instantaneous current counter, in which the pulse train is added periodically recurrently to form a value, and for this value to be stored in a first memory at the end of a period, and for the value then to be reset. The current which is actually flowing through the rechargeable battery is thus determined.

A further refinement of the method provides for the evaluation device to contain a state of charge counter, which determines the state of charge of the rechargeable battery, in which the pulse trains for negative or positive current flow for discharging or charging the rechargeable battery are added continuously to form a value, with this value being stored in a second memory. The gain of the measurement device and the value of the measurement resistor also have to be included in order to precisely determine the current flow through the rechargeable battery. The stored value for the current multiplied by the monitoring time indicates the integrated charge. This allows the state of charge of the rechargeable battery to be derived easily and at low cost, and the remaining rechargeable-battery charge to be determined. There is no need for any additional circuit measures.

A further refinement of the method provides for the value of the instantaneous current counter to be compared with a reference value, with a comparison result being determined from this. A control manipulated variable is derived from this comparison, representing the feedback information for the control system, and controlling the charging device.

The charging current available to the rechargeable battery is thus controlled by means of the method steps mentioned above. When the control system is in the steady state, the charging current corresponds to the reference value.

BRIEF DESCRIPTION OF THE DRAWINGS

The invention will be explained in more detail in the following text with reference to exemplary embodiments and associated figures. The figures are intended solely for illustration of the invention, and are therefore only schematic, and are not to scale. Identical elements or elements having the same effect are provided with the same reference symbols. In the figures:

FIG. 3 shows a further specific exemplary embodiment of the apparatus shown in FIG. 1.

DETAILED DESCRIPTION OF THE DRAWINGS

Figure 1:
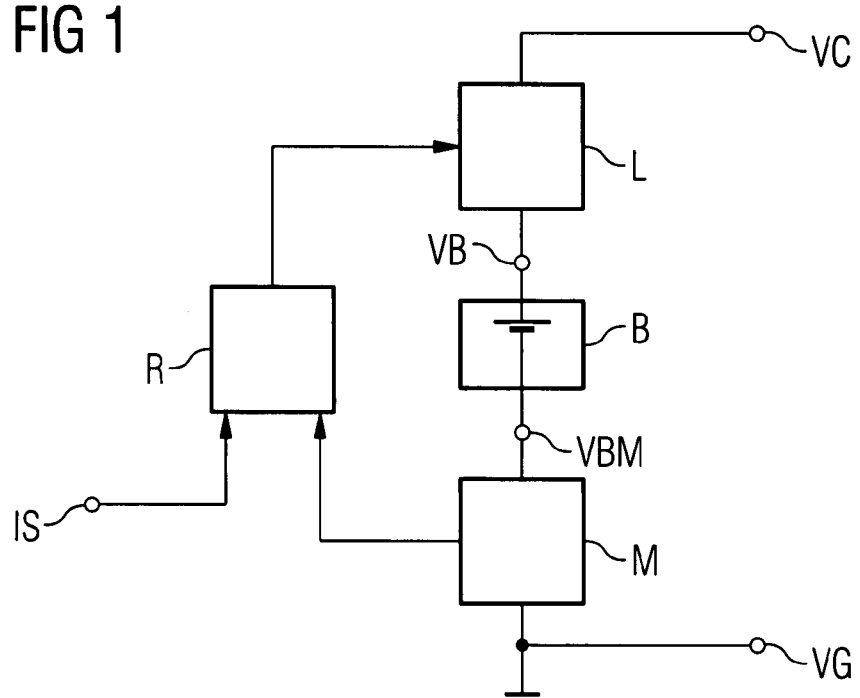
FIG. 1 shows a block diagram of the apparatus according to the invention for charging and for charge monitoring of a rechargeable battery.

FIG. 1 shows a block circuit diagram of an apparatus for charging and for charge monitoring of a rechargeable battery according to the invention. A rechargeable battery B has an output connection VB, at which the rechargeable-battery voltage is produced and to which a charging device L is connected. The charging device is connected to a charging source, for example a DC voltage power supply unit, via a connection VC. A measurement device M which measures and evaluates the current through the rechargeable battery is connected to the charging circuit, which comprises the rechargeable battery B and the charging device L.

The output signal from the measurement device is an instantaneous current value, which is coupled to a control device R. The instantaneous current value is compared in the control device with a set value at the connection IS. The control device uses the difference signal in the comparison process to produce a control manipulated variable, which controls the charging device L and closes the control loop.

The measurement device is able to also determine an accumulated current value and to use this to derive and to display a reading relating to the remaining rechargeable-battery capacity and/or the remaining time for which the rechargeable-battery can be used.

Figure 2:
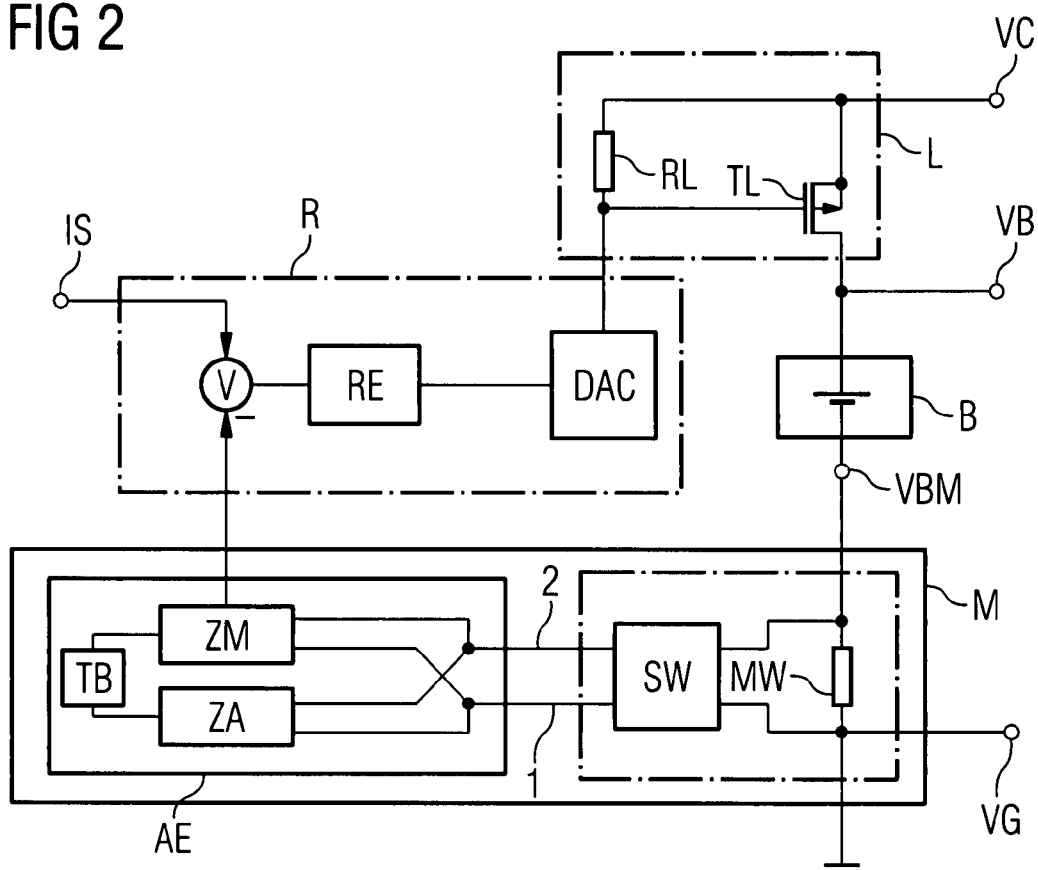
FIG. 2 shows one specific exemplary embodiment of the apparatus shown in FIG. 1.

FIG. 2 shows a specific exemplary embodiment in which, except for the rechargeable battery, all of the elements of the apparatus are integrated in an integrated circuit (IC).

The rechargeable-battery current flows through a measured-value detection device MW with a measurement resistor which is connected in series with the rechargeable battery B. The voltage drop produced across the measurement resistor is detected at the ends of the measurement resistor, and is converted by a signal converter SW to a digital signal. The signal converter is also able to detect the direction of the current into or out of the rechargeable battery. This can be done by comparison, for example subtraction of the measured signal from a reference signal, with the mathematical sign of the comparison result indicating the direction of current flow. Digital signals 1 and 2 which correspond to the magnitude and direction of the current are emitted at the output of the signal detection device, which contains MW and SW, and are supplied to the evaluation device AE. The measured-value detection device MW, the signal converter SW and the evaluation device AE are elements of the measurement device M.

The signal converter SW is in the form of a voltage/frequency converter, and produces pulse trains with frequency that is directly proportional to the magnitude of the voltage drop across the measurement resistor. A downward pulse train characterizes a negative current flow, and an upward pulse train characterizes a positive current flow, in each case with respect to the current direction through the measurement resistor.

The evaluation device AE contains an accumulating counter ZA and an instantaneous current counter ZM, which are each counted upward or downward by the applicable pulse train. This means that a positive voltage drop across the measurement resistor leads to an increase in the instantaneous current counter ZM and the accumulating state of charge counter ZA. This corresponds to a charging process. In consequence, a negative voltage drop leads to a reduction in the instantaneous current counter ZM and in the state of charge counter ZA. This corresponds to a discharging process.

The counters ZM and ZA are clocked by a timebase TB in order to make it possible to calculate the instantaneous current and the current integrated over time, that is to say the charging of the rechargeable battery, from the counts. The calculation can be carried out in the evaluation device AE, for example by means of a computation unit that is not illustrated. The remaining capacity is obtained from the value for the current integrated over time. The instantaneous current and the state of charge of the rechargeable battery are stored in evaluation device memories, and can be displayed by means of a display apparatus, which is not illustrated.

The output of the instantaneous current counter or memory leads to a comparison device V for the control device R. A reference value, which is applied to the connection IS, is applied to the other input of the comparator V. The comparison device V digitally compares the value of the instantaneous current counter and the reference value. A difference signal is determined as the comparison result at the output of the comparator, and is supplied to a regulating unit RE which, on the basis of its control characteristic, produces a control manipulation signal, which is converted by a control signal converter DAC, for example a digital/analog converter, to an analog signal, and controls the charging device.

The charging device L contains a MOS transistor TL of the p-channel type, with its source and gate being connected via a charging resistor RL. The resistor RL is used to set a bias voltage between the source and gate of the transistor TL. The control signal from the control device R is applied to the gate. The source of the transistor TL is connected to the terminal VC for connection of the charging source, and its drain is connected to the positive voltage connection of the rechargeable battery B.

FIG. 3 shows an apparatus according to the invention which differs from FIG. 2 as follows.

The charging device contains a bipolar pnp transistor TL1 instead of the MOS transistor, and is in the form of an external charging device. The resistor RL1 is therefore also external, although it could also be integrated in the IC. The resistor RL1 is used to set a bias voltage between the base and emitter of the transistor TL1.

The measured-value detection device MW1 is connected externally to the IC and is connected in series with the positive connection of the rechargeable battery, between the charging device and the rechargeable battery.

As is illustrated explicitly, the signal converter SW1 contains a comparator V2 which is used to determine the current, in particular including its direction as well, and an analog/digital converter ADC, which converts the analog measurement signal to a digital signal, for example by voltage-to-frequency conversion.

The signal converter SW1, the evaluation device AE with the counters ZM, ZA and the timebase TB as well as the control device R are integrated in an IC.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An apparatus for charging and for charge monitoring of a rechargeable battery, comprising:
    a charging circuit which includes the rechargeable battery and a charging device for charging the rechargeable battery, and a measurement device, wherein the measurement device includes a device for determining the rechargeable-battery current and the state of charge of the rechargeable battery; and
    a control device which compares a value that is proportional to the rechargeable-battery current with a set value, and controls the charging device by adjusting the rechargeable-battery current until a difference between the value that is proportional to the rechargeable-battery current and the set value disappears, wherein the control device contains a regulator unit and a control signal converter connected to it, wherein the control signal converter contains a digital-to-analog converter, and wherein the digital-to-analog converter provides an analog control signal to control the charging device.

2. The apparatus as claimed in claim 1, wherein the rechargeable battery is based on lithium.

3. The apparatus as claimed in claim 1, wherein the measurement device contains a measured-value detection device and a downstream signal converter.

4. The apparatus as claimed in claim 3, wherein the signal converter contains a means for conversion of a voltage drop to a digital signal.

5. The apparatus as claimed in claim 4, wherein the means for conversion of the voltage drop to a digital signal contains a voltage/frequency converter or a sigma-delta converter.

6. The apparatus as claimed in claim 3, wherein the device for determining the rechargeable-battery current contains an evaluation device whose input side is connected to the signal converter.

7. The apparatus as claimed in claim 6, wherein the evaluation device contains:
an accumulating counter, having a value that corresponds to the state of charge of the rechargeable battery, and
an instantaneous current counter, having a value that is proportional to the instantaneous value of the rechargeable-battery current.

8. The apparatus as claimed in claim 1, in which the state of charge of the rechargeable battery is determined by means of the accumulating counter and a timebase.

9. The apparatus as claimed in claim 1, wherein the value of the instantaneous current counter and a reference value are applied to the input side of a comparator for the control device.

10. The apparatus as claimed in claim 1, wherein the charging device contains a transistor.

11. The apparatus as claimed in claim 10, in which the transistor is connected as an external component to an integrated circuit arrangement.

12. The apparatus as claimed in claim 1, wherein the charging device contains a resistor for setting a bias voltage.

13. The apparatus as claimed in claim 12, in which the resistor is connected as an external component to an integrated circuit arrangement.

14. The apparatus as claimed in claim 1, wherein the apparatus is in the form of an integrated circuit arrangement.

15. The apparatus as claimed in claim 1, wherein the measurement device contains an external component for measured-value detection.

16. The apparatus as claimed in claim 1, wherein the measurement device detects the magnitude and direction of the rechargeable-battery current.

17. A method for charging and for charge monitoring of a rechargeable battery, comprising the steps of:
detecting a measurement signal for the rechargeable-battery current;
producing a digital measurement signal from the measurement signal;
processing the digital measurement signal in order to form a first current value for determining the state of charge of the rechargeable battery;
processing the digital measurement signal in order to form a second current value;
comparing the second current value with a reference value, and determining a difference result;
producing a control manipulated variable from the difference result by a regulator;
converting the control manipulated variable into an analog control signal by a control signal converter comprising a digital-to-analog converter;
controlling a charging device for the rechargeable battery with the aid of the analog control signal; and
adjusting the rechargeable-battery current until the difference result between the second current value and the reference value disappears.

18. The method as claimed in claim 17, wherein the digital measurement signal is produced as an upward-counting signal or as a downward-counting signal.

19. The method as claimed in claim 17, wherein the digital measurement signal is added periodically recurrently using an instantaneous current counter and a timebase to form a value, in that this value is stored at the end of a period, and in that the value is then reset.

20. The method as claimed in claim 19, wherein the digital measurement signal is added continuously using an accumulating current counter and a timebase to form a current value which corresponds to the state of charge of the rechargeable battery.

21. The method as claimed in claim 20, wherein an instantaneous current and an accumulated current are derived from the gain of a signal converter, the time duration of the timebase and the value of a measurement resistor.

22. An apparatus for charging and for charge monitoring of a rechargeable battery, comprising:
a charging circuit which includes a rechargeable battery and a charging device for charging the rechargeable battery, and a measurement device, wherein the measurement device includes a device for determining the rechargeable-battery current and the state of charge of the rechargeable battery; and
a control device which compares a value that is proportional to the rechargeable-battery current with a set value, and controls the charging device by adjusting the rechargeable-battery current until a difference between the value that is proportional to the rechargeable-battery current and the set value disappears,
wherein the charging device contains a transistor,
wherein the charging device contains a resistor for setting a bias voltage, and
wherein the resistor is connected between a control terminal of the transistor and a first terminal of the transistor, the first terminal of the transistor is connected to a charging source, and
the control device provides a control signal which is applied to the control terminal of the transistor.

* * * * *